US009918163B1

(12) United States Patent

Ayrapetian et al.

(10) Patent No.: US 9,918,163 B1

(45) Date of Patent: Mar. 13, 2018

(54) ASYNCHRONOUS CLOCK FREQUENCY DOMAIN ACOUSTIC ECHO CANCELLER

(71) Applicant: Amazon Technologies, Inc., Seattle, WA (US)

(72) Inventors: Robert Ayrapetian, Morgan Hill, CA (US); Philip Ryan Hilmes, San Jose, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 15/341,520

(22) Filed: Nov. 2, 2016

Related U.S. Application Data

(63) Continuation of application No. 14/753,332, filed on Jun. 29, 2015, now Pat. No. 9,516,410.

(51) Int. Cl.

| | |
|---|---|
| ***H04B 3/20*** | (2006.01) |
| ***H04R 3/02*** | (2006.01) |
| *H04R 1/10* | (2006.01) |
| *H04S 3/00* | (2006.01) |

(52) U.S. Cl.

CPC ............. *H04R 3/02* (2013.01); *H04R 1/1008* (2013.01); *H04R 1/1083* (2013.01); *H04R 2420/07* (2013.01); *H04S 3/00* (2013.01)

(58) Field of Classification Search

CPC .................................... H04R 3/02; H04B 3/20

See application file for complete search history.

(56) References Cited

U.S. PATENT DOCUMENTS

| | | | | |
|---|---|---|---|---|
| 8,611,408 B2 * | 12/2013 | Xia | H04L 25/03057 | 375/229 |
| 2001/0038674 A1 * | 11/2001 | Trans | H04B 1/00 | 375/355 |
| 2006/0039459 A1 * | 2/2006 | Kolze | H04B 1/1027 | 375/232 |
| 2008/0285640 A1 * | 11/2008 | McCallister | H04L 25/03044 | 375/233 |
| 2009/0075612 A1 * | 3/2009 | Keehr | H03D 7/14 | 455/226.1 |
| 2015/0163015 A1 * | 6/2015 | Katayama | H04L 1/0054 | 375/285 |

* cited by examiner

*Primary Examiner* — Simon King

(74) *Attorney, Agent, or Firm* — Pierce Atwood LLP

(57) ABSTRACT

An echo cancellation system that detects and compensations for differences in sample rates between the echo cancellation system and a set of wireless speakers based on a frequency-domain analysis of estimated impulse response coefficients. The system tracks the real and imaginary number components of the coefficients, and determines a "rotation" of the coefficients over time caused by a frequency offset between the audio sent to the speakers and the audio received from a microphone. Based on the rotation, samples of the audio are added or dropped when echo cancellation is performed, compensating for the frequency offset.

20 Claims, 10 Drawing Sheets

ASYNCHRONOUS CLOCK FREQUENCY DOMAIN ACOUSTIC ECHO CANCELLER

CROSS-REFERENCE TO RELATED APPLICATION

This application is a continuation of, and claims the benefit of priority of, U.S. Non-provisional patent application Ser. No. 14/753,332, filed Jun. 29, 2015 and entitled "ASYNCHRONOUS CLOCK FREQUENCY DOMAIN ACOUSTIC ECHO CANCELLER," the contents of which is expressly incorporated herein by reference in its entirety.

BACKGROUND

In audio systems, automatic echo cancellation (AEC) refers to techniques that are used to recognize when a system has recaptured sound via a microphone after some delay that the system previously output via a speaker. Systems that provide AEC subtract a delayed version of the original audio signal from the captured audio, producing a version of the captured audio that ideally eliminates the "echo" of the original audio signal, leaving only new audio information. For example, if someone were singing karaoke into a microphone while prerecorded music is output by a loudspeaker, AEC can be used to remove any of the recorded music from the audio captured by the microphone, allowing the singer's voice to be amplified and output without also reproducing a delayed "echo" the original music. As another example, a media player that accepts voice commands via a microphone can use AEC to remove reproduced sounds corresponding to output media that are captured by the microphone, making it easier to process input voice commands.

BRIEF DESCRIPTION OF DRAWINGS

For a more complete understanding of the present disclosure, reference is now made to the following description taken in conjunction with the accompanying drawings.

DETAILED DESCRIPTION

Figure 1A:
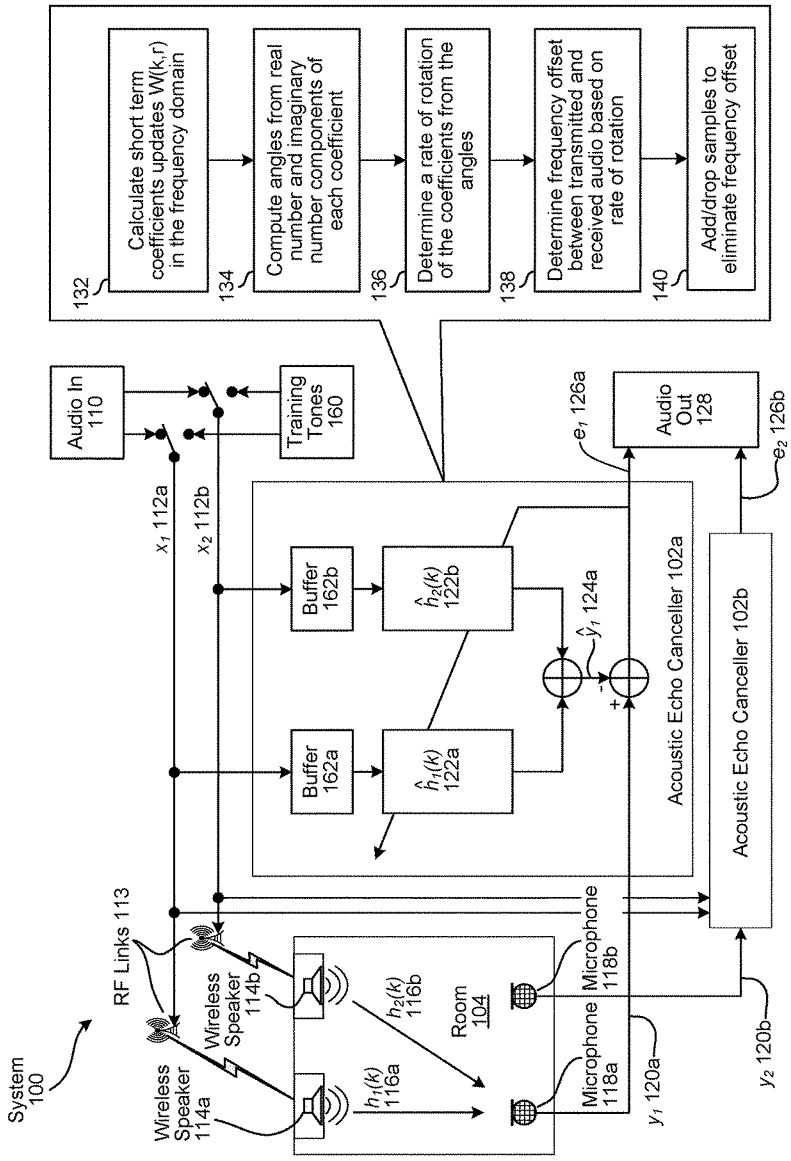
FIGS. 1A to 1C illustrate an echo cancellation system that compensates for frequency offsets caused by differences in sampling rates.

Many electronic devices operate based on a timing "clock" signal produced by a crystal oscillator. For example, when a computer is described as operating at 2 GHz, the 2 GHz refers to the frequency of the computer's clock. This clock signal can be thought of as the basis for an electronic device's "perception" of time. Specifically, a synchronous electronic device may time its own operations based on cycles of its own clock. If there is a difference between otherwise identical devices' clocks, these differences can result in some devices operating faster or slower than others.

In stereo and multi-channel audio systems that include wireless or network-connected loudspeakers and/or microphones, a major cause of problems for conventional AEC is when there is a difference in clock synchronization between loudspeakers and microphones. For example, in a wireless "surround sound" 5.1 system comprising six wireless loudspeakers that each receive an audio signal from a surround-sound receiver, the receiver and each loudspeaker has its own crystal oscillator which provides the respective component with an independent "clock" signal.

Among other things that the clock signals are used for is converting analog audio signals into digital audio signals ("A/D conversion") and converting digital audio signals into analog audio signals ("D/A conversion"). Such conversions are commonplace in audio systems, such as when a surround-sound receiver performs A/D conversion prior to transmitting audio to a wireless loudspeaker, and when the loudspeaker performs D/A conversion on the received signal to recreate an analog signal. The loudspeaker produces audible sound by driving a "voice coil" with an amplified version of the analog signal.

An implicit premise in using an acoustic echo canceller (AEC) is that the clock for A/D conversion for a microphone and the clock for D/A conversion are generated from the same oscillator (there is no frequency offset between A/D conversion and D/A conversion). In modern complex devices (PCs, smartphones, smart TVs, etc.), this condition cannot be satisfied, because of the use of multiple audio devices, external devices connected by USB or wireless, and so on. The difference in sampling rate between the clocks degrades the AEC performance. That means that a standard AEC cannot be used if the clock of A/D and D/A are not made from the same crystal.

A problem for an AEC system occurs when the audio that the surround-sound receiver transmits to a speaker is output at a subtly different "sampling" rate by the loudspeaker. When the AEC system attempts to remove the audio output by the loudspeaker from audio captured by the system's microphone(s) by subtracting a delayed version of the originally transmitted audio, the playback rate of the audio captured by the microphone is subtly different than the audio that had been sent to the loudspeaker.

For example, consider loudspeakers built for use in a surround-sound system that transfers audio data using a 48 kHz sampling rate (i.e., 48,000 digital samples per second of analog audio signal). An actual rate based on a first component's clock signal might actually be 48,000.001 samples per second, whereas another component might operate at an actual rate of 48,000.002 samples per second. This difference of 0.001 samples per second between actual frequencies is referred to as a frequency "offset." The consequences of a frequency offset is an accumulated "drift" in the timing between the components over time. Uncorrected, after one-thousand seconds, the accumulated drift is an entire sample of difference between components.

In practice, each loudspeaker in a multi-channel audio system may have a different frequency offset to the surround sound receiver, and the loudspeakers may have different frequency offsets relative to each other. If the microphone(s) are also wireless or network-connected to the AEC system (e.g., a microphone on a wireless headset), they may also contribute to the accumulated drift between the captured reproduced audio signal(s) and the captured audio signals(s).

FIG. 1A illustrates a high-level conceptual block diagram of echo-cancellation aspects of a multi-channel AEC system 100 in "time" domain. As illustrated, an audio input 110 provides stereo audio "reference" signals $x_1(n)$ 112*a* and $x_2(n)$ 112*b*. The reference signal $x_1(n)$ 112*a* is transmitted via a radio frequency (RF) link to a wireless loudspeaker 114*a*, and the reference signal $x_2(n)$ 112*b* is transmitted via an RF link 113 to a wireless loudspeaker 114*b*. Each speaker outputs the received audio, and portions of the output sounds are captured by a pair of microphone 118*a* and 118*b*. As will be described further below, each AEC 102 performs echo-cancellation in the frequency domain, but the system 100 is illustrated in FIG. 1A in time domain to provide context. The improved method of using frequency-domain AEC algorithm is based on a STFT (short-time Fourier transform) time-domain to frequency-domain conversion to estimate frequency offset, and the method of using the measured frequency offset to correct it.

The portion of the sounds output by each of the loudspeakers that reaches each of the microphones 118*a*/118*b* can be characterized based on transfer functions. FIG. 1 illustrates transfer functions $h_1(n)$ 116*a* and $h_2(n)$ 116*b* between the loudspeakers 114*a* and 114*b* (respectively) and the microphone 118*a*. The transfer functions vary with the relative positions of the components and the acoustics of the room 104. If the position of all of the objects in a room 104 are static, the transfer functions are likewise static. Conversely, if the position of an object in the room 104 changes, the transfer functions may change.

The transfer functions (e.g., 116*a*, 116*b*) characterize the acoustic "impulse response" of the room 104 relative to the individual components. The impulse response, or impulse response function, of the room 104 characterizes the signal from a microphone when presented with a brief input signal (e.g., an audible noise), called an impulse. The impulse response describes the reaction of the system as a function of time. If the impulse response between each of the loudspeakers 116*a*/116*b* is known, and the content of the reference signals $x_1(n)$ 112*a* and $x_2(n)$ 112*b* output by the loudspeakers is known, then the transfer functions 116*a* and 116*b* can be used to estimate the actual loudspeaker-reproduced sounds that will be received by a microphone (in this case, microphone 118*a*). The microphone 118*a* converts the captured sounds into a signal $y_1(n)$ 120*a*. A second set of transfer functions is associated with the other microphone 118*b*, which converts captured sounds into a signal $y_2(n)$ 120*b*.

The "echo" signal $y_1(n)$ 120*a* contains some of the reproduced sounds from the reference signals $x_1(n)$ 112*a* and $x_2(n)$ 112*b*, in addition to any additional sounds picked up in the room 104. The echo signal $y_1(n)$ 120*a* can be expressed as:

$$y_1(n)=h_1(n)*x_1(n)+h_2(n)*x_2(n) \qquad [1]$$

where $h_1(n)$ 116*a* and $h_2(n)$ 116*b* are the loudspeaker-to-microphone impulse responses in the receiving room 104, $x_1(n)$ 112*a* and $x_2(n)$ 112*b* are the loudspeaker reference signals, * denotes a mathematical convolution, and "n" is an audio sample.

The acoustic echo canceller 102*a* calculates estimated transfer functions $\hat{h}_1(n)$ 122*a* and $\hat{h}_2$ (n) 122*b*. These estimated transfer functions produce an estimated echo signal $\hat{y}_1(n)$ 124*a* corresponding to an estimate of the echo component in the echo signal $y_1(n)$ 120*a*. The estimated echo signal can be expressed as:

$$\hat{y}_1(n)=\hat{h}_1(k)*x_1(n)+\hat{h}_2(n)*x_2(n) \qquad [2]$$

where * again denotes convolution. Subtracting the estimated echo signal 124*a* from the echo signal 120*a* produces the error signal $e_1(n)$ 126*a*, which together with the error signal $e_2(n)$ 126*b* for the other channel, serves as the output (i.e., audio output 128). Specifically:

$$\hat{e}_1(n)=y_1(n)-\hat{y}_1(n) \qquad [3]$$

The acoustic echo canceller 102*a* calculates frequency domain versions of the estimated transfer functions $\hat{h}_1(n)$ 122*a* and $\hat{h}_2(n)$ 122*b* using short term adaptive filter coefficients W(k,r). In conventional AEC systems operating in time domain, the adaptive filter coefficients are derived using least mean squares (LMS) or stochastic gradient algorithms, which use an instantaneous estimate of a gradient to update an adaptive weight vector at each time step. With this notation, the LMS algorithm can be iteratively expressed in the usual form:

$$h_{new}=h_{old}+\mu*e*x \qquad [4]$$

where $h_{new}$ is an updated transfer function, $h_{old}$ is a transfer function from a prior iteration, μ is the step size between samples, e is an error signal, and x is a reference signal.

Applying such adaptation over time (i.e., over a series of samples), it follows that the error signal "e" should eventually converge to zero for a suitable choice of the step size μ (assuming that the sounds captured by the microphone 118*a* correspond to sound entirely based on the references signals 112*a* and 112*b* rather than additional ambient noises, such that the estimated echo signal $\hat{y}_1(n)$ 124*a* cancels out the echo signal $y_1(n)$ 120*a*). However, e→0 does not always imply that $h-\hat{h}\to 0$, where the estimated transfer function $\hat{h}$ cancelling the corresponding actual transfer function h is the goal of the adaptive filter. For example, the estimated transfer functions $\bar{h}$ may cancel a particular string of samples, but is unable to cancel all signals, e.g., if the string of samples has no energy at one or more frequencies. As a result, effective cancellation may be intermittent or transitory. Having the estimated transfer function approximate the actual transfer function h is the goal of single-channel echo cancellation, and becomes even more critical in the case of multichannel echo cancellers that require estimation of multiple transfer functions.

While drift accumulates over time, the need for multiple estimated transfer functions $\hat{h}$ in multichannel echo cancellers accelerates the mismatch between the echo signal y from a microphone and the estimated echo signal $\hat{y}$ from the echo canceller. To mitigate and eliminate drift, it is therefore necessary to estimate the frequency offset for each channel, so that each estimated transfer function $\hat{h}$ can compensate for difference in component clocks.

The relative frequency offset can be defined in terms of "ppm" (parts-per-million) error between components. The normalized sampling clock frequency offset (error) is defined as:

$$PPM\text{ error}=\frac{Ftx}{Frx}-1 \qquad [5]$$

For example, if a loudspeaker (transmitter) sampling frequency Ftx is 48,000 Hz and a microphone (receiver) sampling frequency Frx is 48,001 Hz, then the frequency offset between Ftx and Frx is −20.833 ppm. During 1 second, the transmitter and receiver are creating 48,000 and 48,001 samples respectively. Hence, there will be 1 additional sample created at the receiver side during every second.

Figure 1B:
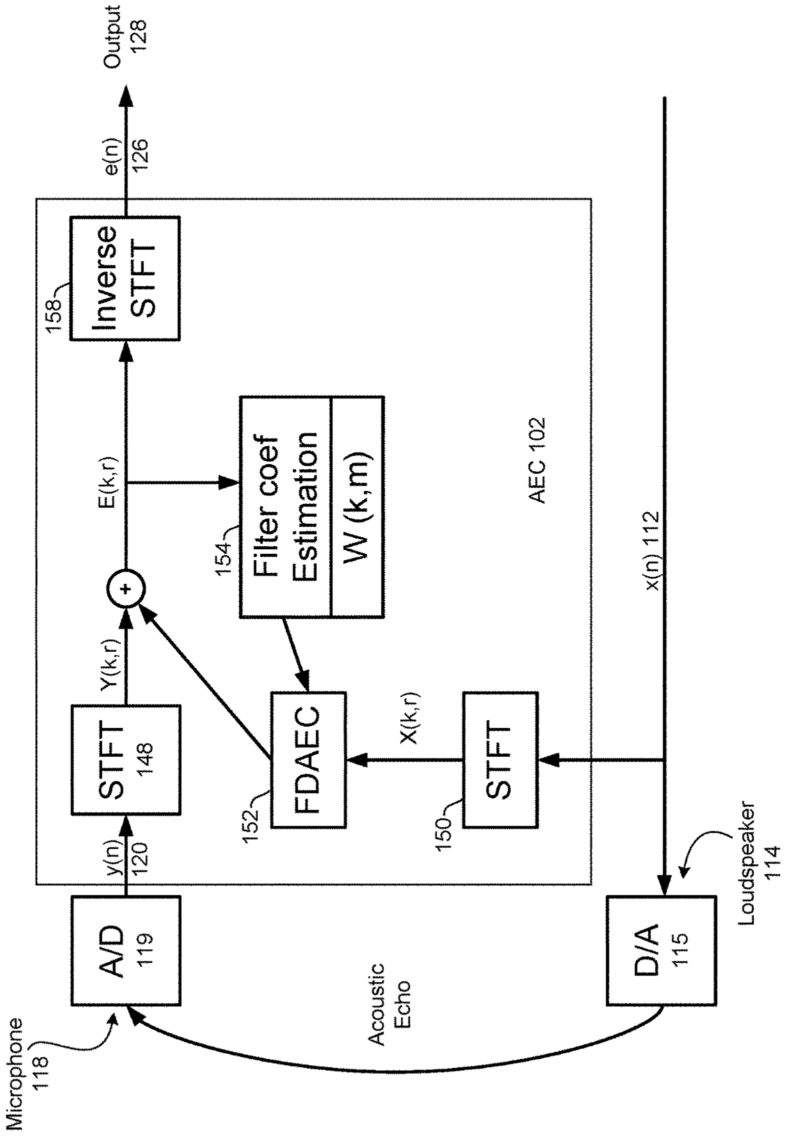
Figure 1C:
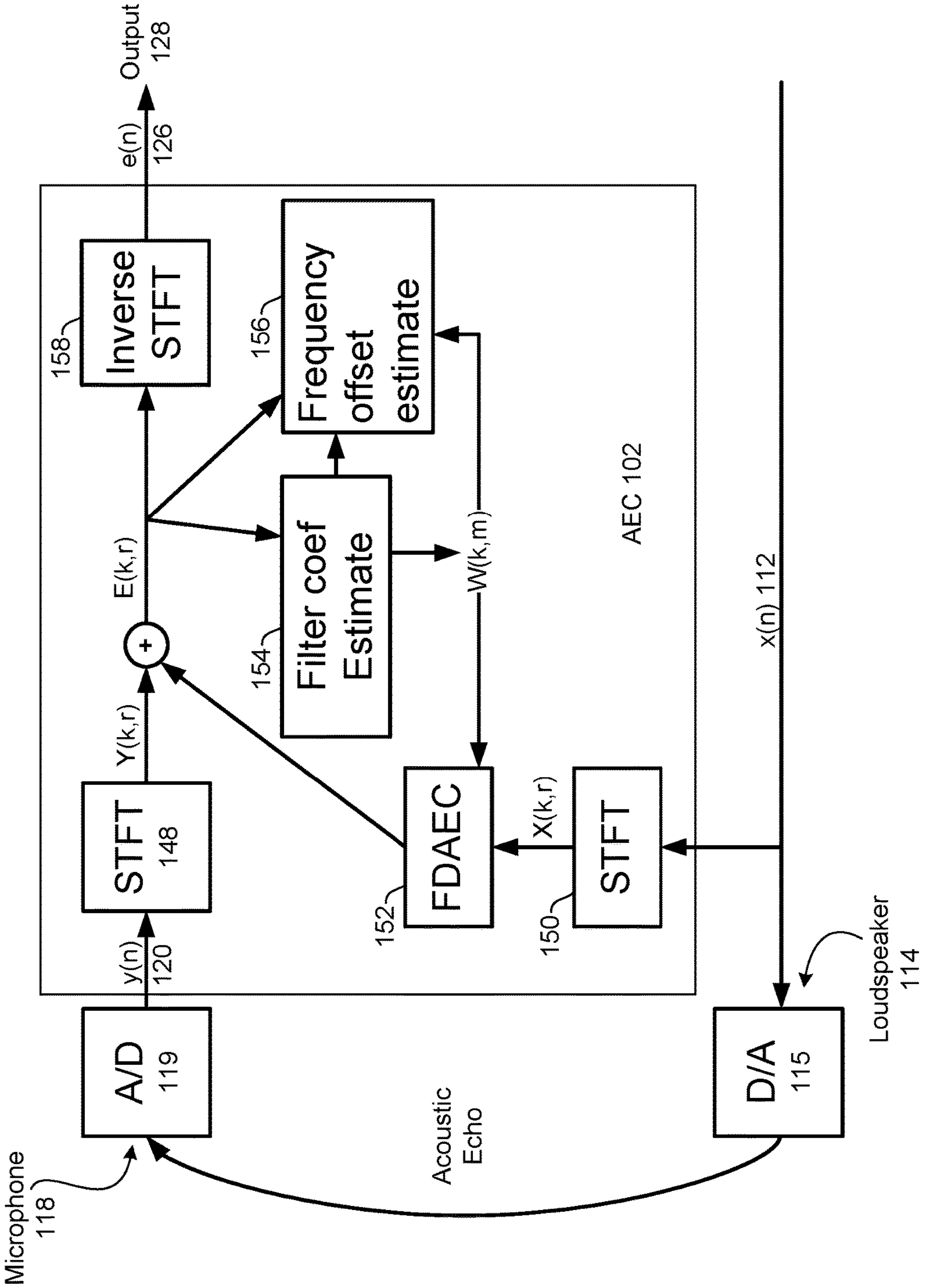

FIGS. 1B and 1C illustrate the frequency domain operations of system 100. The time domain reference signal x(n) 112 is received by a loudspeaker 114, which performs a D/A conversion 115, with the analog signal being output by the loudspeaker 114 as sound. The sound is captured by a microphone 118 of the microphone array, and A/D conversion 119 is performed to convert the captured audio into the time domain signal y(n) 120. The AEC 102 applies a short-time Fourier transform (STFT) 148 to the time domain signal y(n) 120, producing the frequency domain values Y(k,r), where the tone "k" is 0 to N−1 and "r" is a frame index.

The AEC 102 also applies an STFT 150 to the time-domain reference signal x(n) 102, producing the frequency-domain reference values X(k,r). The frequency-domain reference values X(k,r) are input into a frequency domain acoustic echo canceller (FDAEC) 152. The output of the FDAEC 152 is subtracted from the frequency domain values Y(k,r), producing the frequency domain error values E(k,r). Filter coefficients W(k,m) of the FDAEC are estimated by filter coefficient estimator 154 based on the frequency domain error values E(k,r). An inverse STFT 158 is applied to the frequency domain error values E(k,r) to produce time-domain signal e(n) 126 as the output 128.

Figure 2A:
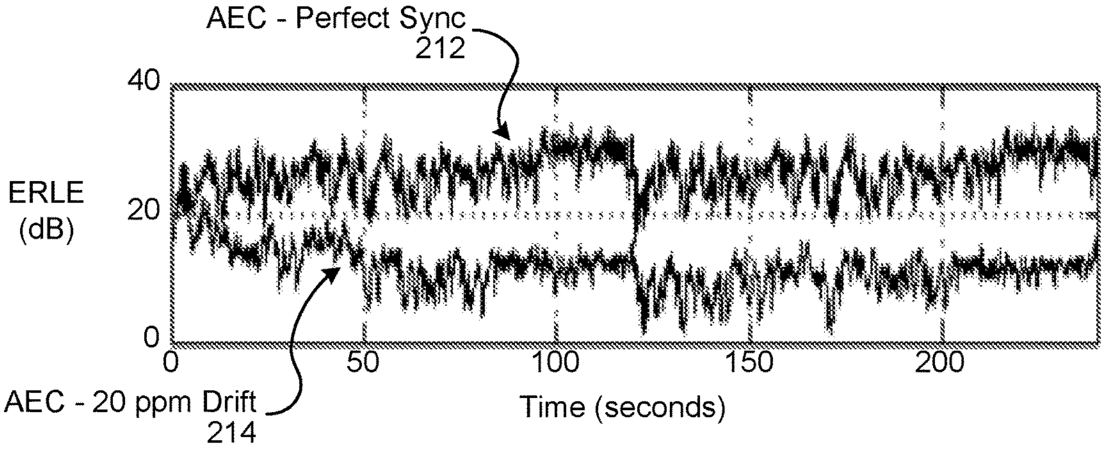
FIGS. 2A to 2C illustrate the reduction in echo-return loss enhancement (ERLE) caused by failing to compensate for frequency offset.
Figure 2B:
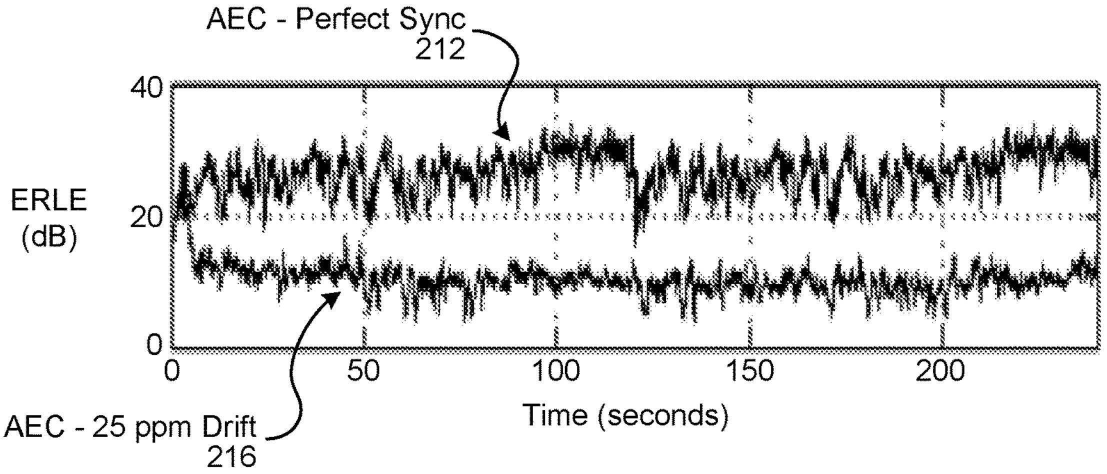
Figure 2C:
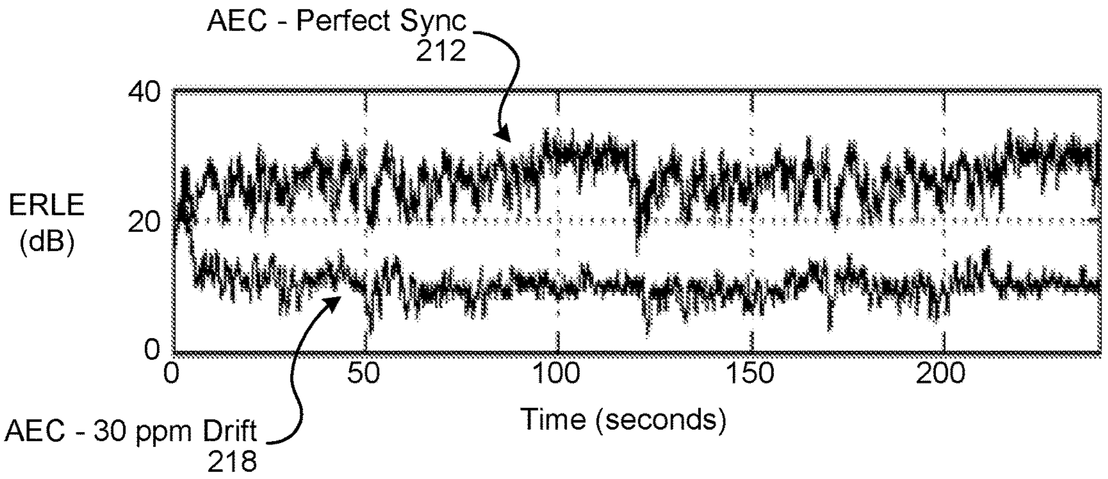

The performance of AEC is measured in ERLE (echo-return loss enhancement). FIGS. 2A, 2B, and 2C are ERLE plots illustrating the performance of conventional AEC with perfect clock synchronization 212 and with 20 ppm (214), 25 ppm (216) and 30 ppm (218) frequency offsets between the clocks associated with one of the loudspeakers and one of microphones.

As illustrated in FIGS. 2A, 2B, and 2C, if the sampling frequencies of the D/A and A/D converters are not exactly the same, then the AEC performance will be degraded dramatically. The different sampling frequencies in the microphone and loudspeaker path cause a drift of the effective echo path.

For normal audio playback, such differences in frequency offset are usually imperceptible to a human being. However, the frequency offset between the crystal oscillators of the AEC system, the microphones, and the loudspeaker will create major problems for multi-channel AEC convergence (i.e., the error e does not converge to zero). Specifically, the predictive accuracy of the estimated transfer functions (e.g., $\hat{h}_1(n)$ and $\hat{h}_2(n)$) will rapidly degrade as a predictor of the actual transfer functions (e.g., $h_1(n)$ and $h_2(n)$).

A communications protocol-specific solution to this problem has been to embed a sinusoidal pilot signal when transmitting reference signals "x" and receiving echo signals "y." Using a phase-locked loop (PLL) circuit, components can synchronize their clocks to the pilot signal, and/or estimate the frequency error. However, that requires that the communications protocol between components supports use of a pilot, and that each component supports clock synchronization.

Another alternative is to transmit an audible sinusoidal signal with the reference signals x. Such a solution does not require a specialized communications protocol, nor any particular support from components such as the loudspeakers and microphones. However, the audible signal will be heard by users, which might be acceptable during a startup or calibration cycle, but is undesirable during normal operations. Further, if limited to startup or calibration, any information gleaned as to frequency offsets will be static, such that the system will be unable to detect if the frequency offset changes over time (e.g., due to thermal changes within a component altering frequency of the component's clock).

Another alternative is to transmit an ultrasonic sinusoidal signal with the reference signals x at a frequency that is outside the range of frequencies that human beings can perceive. A first shortcoming of this approach is that it requires loudspeakers and microphones capable of operating at the ultrasonic frequency. Another shortcoming is that the ultrasonic signal will create a constant sound "pressure" on the microphones, potentially reducing the microphones' sensitivity in the audible parts of the spectrum.

To address these shortcomings of the conventional solutions, the acoustic echo cancellers 102*a* and 102*b* in FIG. 1B correct for frequency offsets between components based entirely on the transmitted and received audio signals (e.g., x(n) 112, y(n) 120) using frequency-domain calculation. No pilot signals are needed, and no additional signals need to be embedded in the audio. Compensation may be performed by adding or dropping samples to eliminate the ppm offset.

From definition of the PPM error in Equation 5, if the frequency offset is "A" ppm, then in 1/A samples, one additional sample will be added. This may be performed, for example, by adding on a duplicate of the last sample every 1/A samples. Hence, if difference is 1 ppm, then one additional sample will be created in $1/1e\text{-}6=10^6$ samples; if the difference is 20.833 ppm, then one additional sample will be added for every 48,000 samples; and so on. Likewise, if the frequency offset is "−A" ppm, then in 1/A samples, one additional sample will be dropped. This may be performed, for example, by dropping/skipping the last sample every 1/A samples.

For the purposes of discussion, an example of system 100 includes "Q" loudspeakers 114 (Q>1) and a separate microphone array system (microphones 118) for hands free near-end/far-end multichannel AEC applications. The frequency offsets for each loudspeaker and the microphone array can be characterized as df1, df2, . . . , dfQ. Existing and well known solutions for frequency offset correction for LTE (Long Term Evolution cellular telephony) and WiFi (free running oscillators) are based on Fractional Delayed Interpolator methods. Fractional delay interpolator methods provide accurate correction with additional computational cost. Accurate correction is required for high speed communication systems. However, audio applications are not high speed and relatively simple frequency correction algorithm could be applied, such as a sample add/drop method. Hence, if playback of reference signals $x_1$ 112(*a*) (corresponding to loudspeaker 114*a*) is signal 1, and the frequency offset between signal 1 and the microphone output signal $y_1$ 120*a* is dfk, then frequency correction may be performed by dropping/adding one sample every 1/dfk samples.

The acoustic echo canceller(s) 102 use short time Fourier transform-based frequency-domain multi-tap acoustic echo cancellation (STFT AEC) to estimate frequency offset. The following high level description of STFT AEC refers to echo signal y (120) which is a time-domain signal comprising an echo from at least one loudspeaker (114) and is the output of a microphone 118. The reference signal x (112) is a time-domain audio signal that is sent to and output by a loudspeaker (114). The variables X and Y correspond to a Short Time Fourier Transform of x and y respectively, and thus represent frequency-domain signals. A short-time Fourier transform (STFT) is a Fourier-related transform used to determine the sinusoidal frequency and phase content of local sections of a signal as it changes over time.

Using a Fourier transform, a sound wave such as music or human speech can be broken down into its component "tones" of different frequencies, each tone represented by a sine wave of a different amplitude and phase. Whereas a time-domain sound wave (e.g., a sinusoid) would ordinarily be represented by the amplitude of the wave over time, a frequency domain representation of that same waveform comprises a plurality of discrete amplitude values, where each amplitude value is for a different tone or "bin." So, for example, if the sound wave consisted solely of a pure sinusoidal 1 kHz tone, then the frequency domain representation would consist of a discrete amplitude spike in the bin containing 1 kHz, with the other bins at zero. In other words, each tone "k" is a frequency index. The response of a Fourier-transformed system, as a function of frequency, can also be described by a complex function.

If the STFT is an "N" point Fast Fourier Transform (FFT), then the frequency-domain variables would be X(k,r) and Y(k,r), where the tone "k" is 0 to N−1 and "r" is a frame index. The STFT AEC uses a "multi-tap" process. That means for each tone "k" there are M taps, where each tap corresponds to a sample of the signal at a different time. Each tone "k" is a frequency point produced by the transform from time domain to frequency domain, and the history of the values across iterations is provided by the frame index "r."

As an example, if a 256-point FFT is performed on a 16 kHz time-domain signal, the output is 256 complex numbers, where each complex number corresponds to a value at a frequency in increments of 16 kHz/256, such that there is 125 Hz between points, with point 0 corresponding to 0 Hz and point 255 corresponding to 16 kHz.

Hence the STFT taps would be W(k,m), where k is 0 to N−1 and m is 0 to M−1. The tap parameter M is defined based on tail length of AEC. The "tail length," in the context of AEC, is a parameter that is a delay offset estimation. For example, if the STFT processes tones in 8 ms samples and the tail length is defined to be 240 ms, then M=240/8 which would correspond to M=32.

Given a signal z[n], the STFT Z(k,r) of x[n] is defined by $$Z(k, r) = \sum_{n=0}^{N-1} Win(n) * z(n + r * R) * e^{-2pi*k*n/N} \quad [6.1]$$

Where, Win(n) is a window function for analysis, k is a frequency index, r is a frame index, R is a frame step, and N is an FFT size. Hence, for each block (at frame index r) of N samples, the STFT is performed which produces N complex tones X(k,r) corresponding frequency index k and frame index r.

Referring to the Acoustic Echo Cancellation using STFT operations in FIG. 1B, y(n) 120 is the input signal from the microphone 118 and Y(k,r) it's the STFT representation:

$$Y(k, r) = \sum_{n=0}^{N-1} Win(n) * y(n + r * R) * e^{-2pi*k*n/N} \quad [6.2]$$

The reference signal x(n) 112 to the loudspeaker 114 has a frequency domain STFT representation:

$$X(k, r) = \sum_{n=0}^{N-1} Win(n) * x(n + r * R) * e^{-2pi*k*n/N} \quad [6.3]$$

W(k,m) is an estimated echo channel for each frequency index k and frame m, where m=0, 1, . . . , M−1. For each frequency index k there are M estimated echo channels W(k,0), W(k,1), . . . , W(k,M−1). The value of M depends on room impulse response tail length. For example if room reverberation time T60 is 240 ms and frame duration is 8 ms then M=240/8 (M=30).

The general concept of the AECs 102 in FIG. 1B is a three-stage process comprising (1) filtering, (2) error computation, and (3) coefficient updating. The estimated echo is filtering stage may be defined based on each frequency bin k of the STFT AEC output at frame r being defined as:

$$Z(k, r) = \sum_{m=0}^{M-1} X(k, r - m) * W(k, m) \quad [6.4]$$

where X is two-dimensional matrix that is a frequency-domain expression of a reference signal x 112, k is the tone/bin, m is the tap, and W is two-dimensional matrix of the taps coefficients.

Then, the frequency domain AEC output E(k,r) is computed as an error computation stage comprises:

$$E(k,r)=Y(k,r)-Z(k,r) \quad [7]$$

where E is two-dimensional matrix that is a frequency-domain expression of the error signal e 126, Y is a frequency domain expression of the echo signal y 120, and Z is the result of Equation 6.4. On the first iteration, the value of Z(k,r) may be initialized to zero, with the filtering stage output refined over time. Applying the inverse STFT 158 yields the error signal e 126, which is the AEC output 128 in the time domain.

The tap coefficient updating stage of the filter coefficient estimator 154 comprises:

$$W(k,m)_{new}=W(k,m)_{old}+\mu*E(k,r)*X(k,r-m)^* \quad [8]$$

where μ is the step size between samples as discussed above with Equation 4, and the superscript asterisk appended on to the matrix X(k, r−m) indicates a transpose of the matrix. In essence, this is a frequency domain expression of Equation 4.

The adaptive filtering works to minimize mean square of error for each tone, which can be expressed as:

$$|E(k,r)|^2=|Y(k,r)-Z(k,r)|^2\rightarrow 0 \quad [9]$$

Each iteration of Equation 8 improves the accuracy of the coefficient matrix W(k,m), whereby Equation 9 converges towards zero.

The STFT tap coefficients W in the matrix W(k, m) may be use to characterize the impulse response of the room 104. As noted above, each tone "k" can be represented by a sine wave of a different amplitude and phase, such that each tone may be represented as a complex number. A complex number is a number that can be expressed in the form a+bj, where a and b are real numbers and j is the imaginary unit, that satisfies the equation $j^2=-1$. A complex number whose real part is zero is said to be purely imaginary, whereas a complex number whose imaginary part is zero is a real number. For a sine wave of a given frequency, the real component corresponds to an amplitude of the wave while the imaginary component corresponds to the phase. As the representation of each tone k is a complex value, each entry in the matrix W(k, m) may likewise be a complex number.

The statistical behavior of the values of each tap coefficient W does not depend of the reference signal x (112).

Rather, if there is no frequency offset between the microphone echo signal y (120) and the loudspeaker reference signal x (112) then each "W" tap coefficient will have a zero mean phase rotation. In the alternative, if there is a frequency offset (equal to A PPM) between y and x, then frequency offset will create continuous delay (i.e., will result in the adding/dropping of samples in the time domain). Such a delay will correspond to a phase "rotation" in frequency domain.

Figure 3:
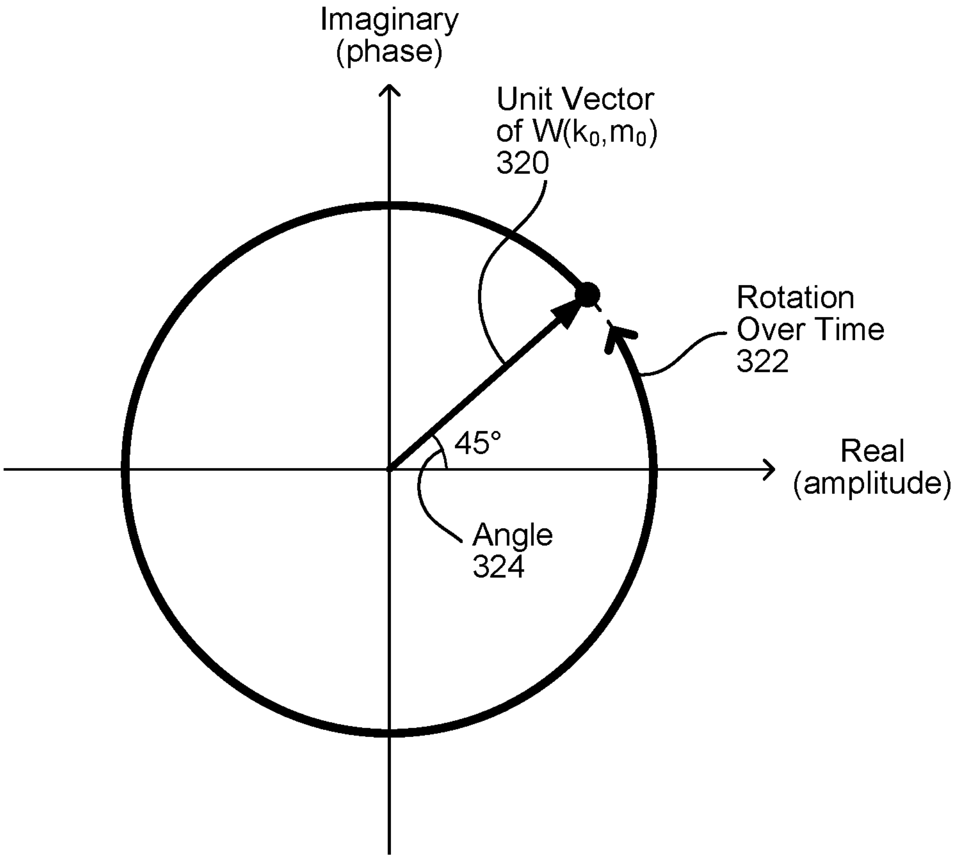
FIG. 3 illustrates the relationship between a complex filter coefficient, its angle, and the rotation of the coefficient over time.

FIG. 3 illustrates phase rotation. A unit vector of the tap coefficient $W(k_0, m_0)$ 320 corresponds to a sinusoid with a real magnitude of 1 and a phase of j. However, it is not necessary to take a unit vector, and instead the complex value may be normalized. Plotted onto a "real" amplitude axis and an "imaginary" phase axis, each complex value results in a two-dimensional vector with a magnitude of 1 and an angle 324 of 45 degrees. However, if there is a frequency offset, a plot of the tap coefficient will begin to rotate over time (illustrated as rotation 322. If the frequency offset is positive, the rotation 322 will be counterclockwise. If the frequency offset is negative, the rotation 322 will be counterclockwise. The speed of the rotation 322 of the angle from frame to frame corresponds to the size of the offset, with a larger offset producing a faster rotation than a smaller offset.

Based on the frequency domain phenomena of the rotation of the tap coefficients corresponding to the magnitude of the frequency offset, each acoustic echo canceller 102 identifies and compensates for the frequency offsets. If there frequency offset in the system 100, then a change in a delay line in time domain (because frequency offset) will introduce rotation for each W(k,r), because the AEC 102 will try to minimize error as defined in Equation 9. Now, as was described, if the frequency offset is "A" ppm, then each tone k and for each frame time, the tap coefficients W(k,r) will be rotated by 2*pi*k*A radians.

In summary, referring back to FIGS. 1A and 1B, the process performed by the AEC 102 is as follows. The estimated impulse response coefficients W(k,r) are calculated (132) in the frequency domain. The angles 324 are computed (134) from the real number and imaginary number components of each coefficient, as each coefficient is a complex number. A rate of rotation 322 is determined (136) from the angles 324. The frequency offset (PPM) between the transmitted reference signal(s) 112 and each received echo signal(s) 120 is determined (138) based on the rate of rotation. Samples are then added or dropped from the circular buffers (162) where the AEC 102 temporarily stores the reference signals x(n) 112.

Figure 4:
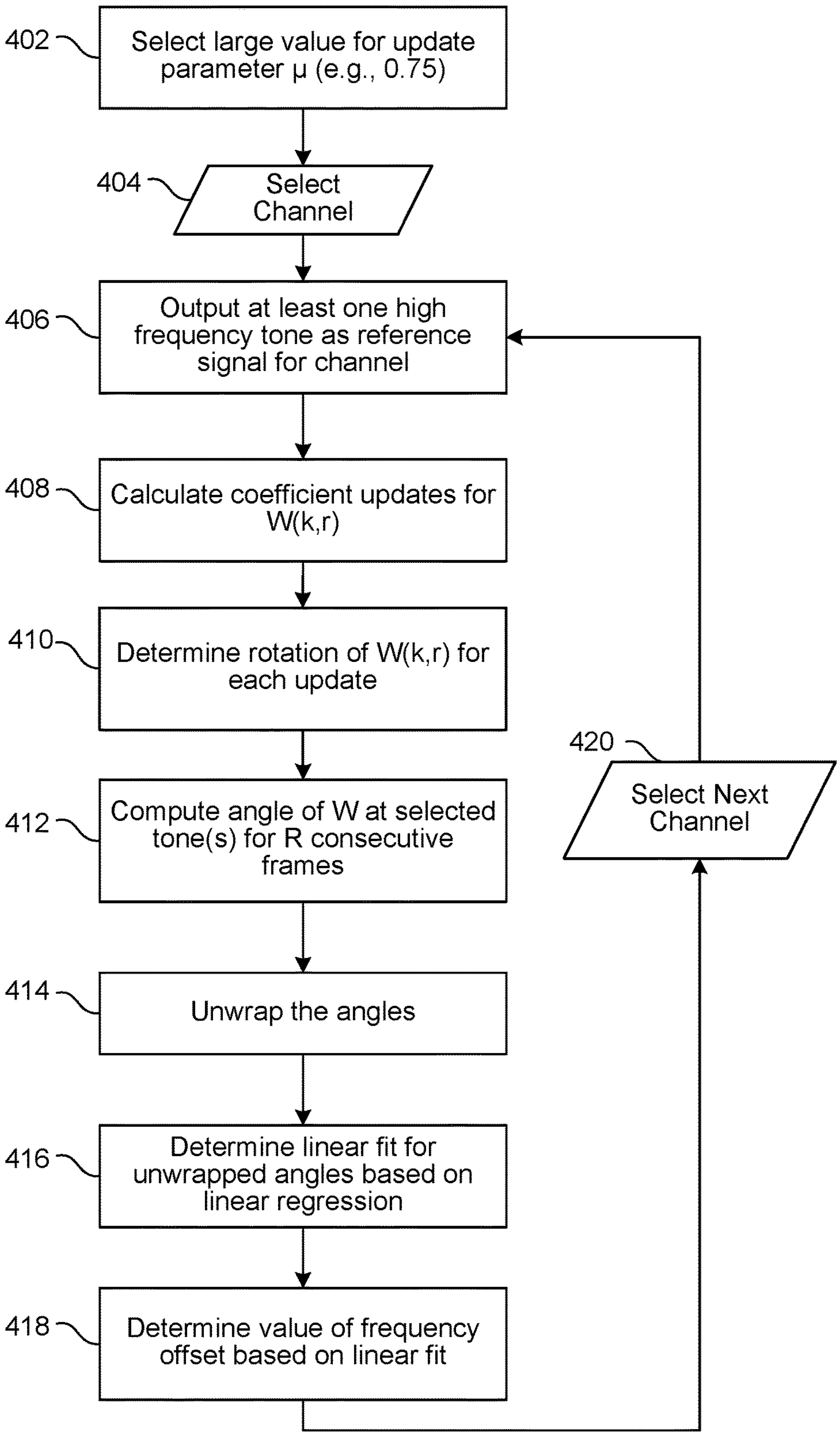
FIG. 4 illustrates a process for initially calibrating the echo cancellation system.

FIG. 4 illustrates a training process for determining the frequency offset. Referring back to FIG. 1C, the frequency offset estimate 156 is based on the filter coefficients W(k,m) and the frequency domain error values E(k,r). Initially, when the system 100 is initially turned on, a relatively large update parameter μ (e.g., 0.75) is selected (402). A relatively large update parameter μ should be used so that the minimizing of the error in accordance with Equation 9 will produce a measurable rotation speed (referring to FIG. 3) as W(k,r) updated in accordance with Equation 8.

A channel (e.g., speaker 114*a*, speaker 114*b*, etc.) is selected (404) for training. A training tone generator 160 outputs (406) at least one training tone as the channel's reference signals x 112 (e.g., 112*a*, or 112*b*). The tones (e.g., K1, K2) are preferably relatively high frequencies within the audible frequency range. The training tones may be, for example, a constant 1 kHz sinusoid and a constant 6 kHz sinusoid. The AEC 102 then calculates (408) coefficient updates for the channel in accordance with Equation 8. For example, 200 iterations of W(k,m) may be calculated over a ten second period for the selected channel. To simplify this explanation, one tone k0 will be used, where K1<=k0<=K2.

The iterative updates of W(k,m) are monitored to determine (410) the rotation of W(k0,r) for each updated, as discussed in connection with FIG. 3. An angle (e.g., 324) of W(k0,r) is computed (312) for "R" consecutive frames r1 to r2, where R equals r2−r1+1. This may be expressed as:

$$aa(k0,p)=\text{angle}(W(k0,p)),\ \text{where } p=r1, \ldots ,r2 \qquad [10]$$

As discussed in connection with FIG. 3, the angle 324 is based on the relative values of the real and imaginary number components of each instance of W(k0,p), as the matrix W(k0,p) is a two-dimensional matrix of complex numbers.

An "unwrap" operation is then performed to unwrap angles aa(k0,p)):

$$va=\text{unwrap}(aa(k0,p)),\ \text{where } p=r1, \ldots ,r2 \qquad [11]$$

In numerical computing environments such as MATLAB, "unwrap" is a function to correct phase angles to produce smoother phase plots. Unwrap(P) corrects the radian phase angles in a vector P by adding multiples of ±2π when absolute jumps between consecutive elements of P are greater than or equal to the default jump tolerance of π radians. If P is a matrix, unwrap operates columnwise. If P is a multidimensional array, unwrap operates on the first non-singleton dimension.

A linear fit for the angles is then determined (416) by performing a linear regression on va and p:

$$u = b1 * p + b0 \qquad [12]$$

$$b1 = \frac{\Sigma(p - pm)(va - va_m)}{\Sigma(p - pm)^2} \qquad [13]$$

$$b0 = va_m - b1 * pm \qquad [14]$$

where, $va_m$=mean(va) and pm=mean(p). The variable p correspond to a measure point, and b1 equals the slope of the line produced by the linear regression, and b0 is the offset. The angle "u" resulting from the linear offset in accordance with Equation 12 increases with frequency offset.

The value of frequency offset for the channel is then determined (416) by Frequency Offset Estimation 156 in FIG. 1C as:

$$PPM=b1/(2*\text{pi}*k0) \qquad [15]$$

When multiple tones are used instead (e.g., K1, K2), the PPM is calculated for each tone in accordance with Equation 15, and an average (mean) of the results may be calculated and used to determine the applied correction. In the alternative, a median value may be taken, or if more than two calibration tones are used, other statistical approaches may be used to determine the final frequency offset, such as selecting a value common to a majority of tones (e.g., 80% of the PPM results for the channel have approximately a same value).

To minimize error (Equation 9), the value of the frequency offset is then used to determine how many samples to add or subtract from the reference signals x(n) 112 input into the AEC 102, to which the estimated transfer functions $\hat{h}(k)$ 122 is applied for that channel. If the PPM value is positive, samples are added (i.e., repeated) to x(n). If the PPM value is negative, samples are dropped. This may be performed, among other ways, by storing the reference signal x(n) 112 received by the AEC 102 in a circular buffer (e.g., 162*a*, 162*b*), and then by modifying read and write pointers for the buffer, skipping or adding samples. In a system including multiple microphones 118, each with a corresponding AEC 102, the AEC 102 may share circular buffer(s) 162 to store the reference signals x(n) 112, but each AEC 102 may independently set its own pointers so that the number of samples skipped or added is specific to that AEC 102. Based on this STFT AEC process, experimental results showed that the improved acoustic echo cancellers 102 provide results within approximately 10% to 25% of perfect frequency error correction.

For systems 100 including multiple speakers 114, the process illustrated in FIG. 4 selects the next channel (420) and then repeats to determine the frequency offset value PPM (Equation 15) for that channel. If there are Q loudspeakers, then for each microphone there are Q sets of STFT AECs ($W_q$(k,r), q=1, . . . , Q). Hence, $W_q$(k,r) may be used to compute frequency offset for loudspeaker "q."

After calibration, during normal audio-output operations, the PPM value for each channel may be refined and updated. This may be performed by identifying frequency components that occur in one reference signal x(n) 122 for a channel, but substantially does not occur the reference signals of the other channels, and determining an updated PPM using the same technique as describe in FIG. 4, with the difference being that "k" is not a training tone from the training tone generator 160, but rather is determined opportunistically based on the applied reference signals from the audio input 110. So, for example, when stereo music features sounds that predominantly occur on the left channel but not the right channel, one or more frequencies that form those sounds may be used to refine the PPM error value for the left channel.

Figure 5:
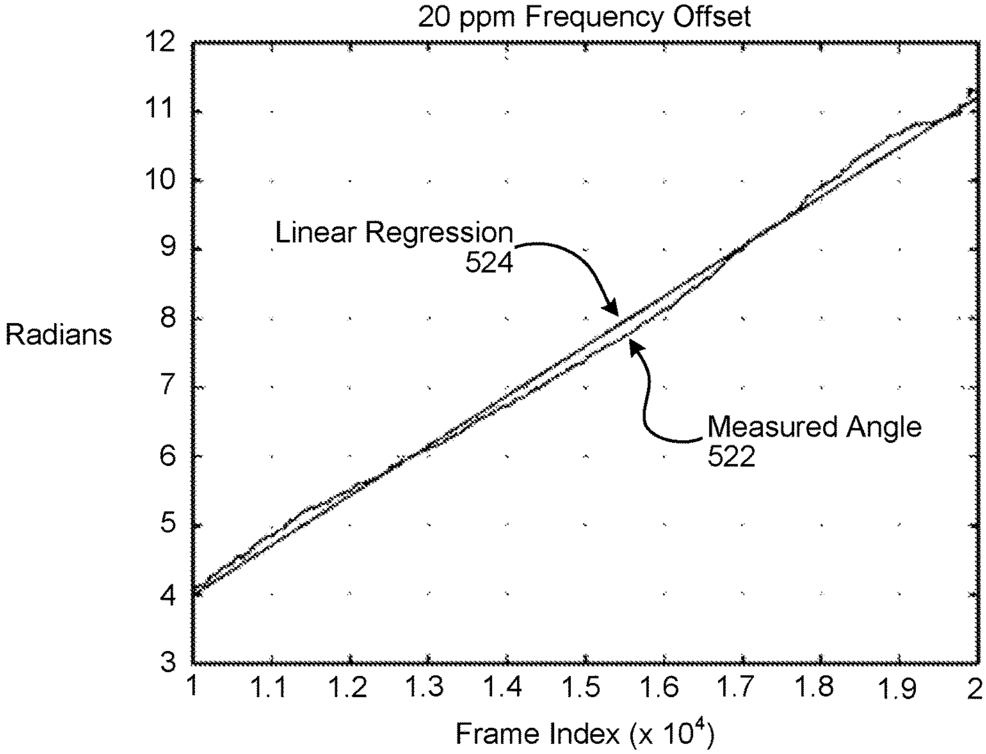
FIGS. 5 to 8 illustrate the ability of the process in FIG. 4 to accurately estimate the angles used to determine the frequency offset.
Figure 6:
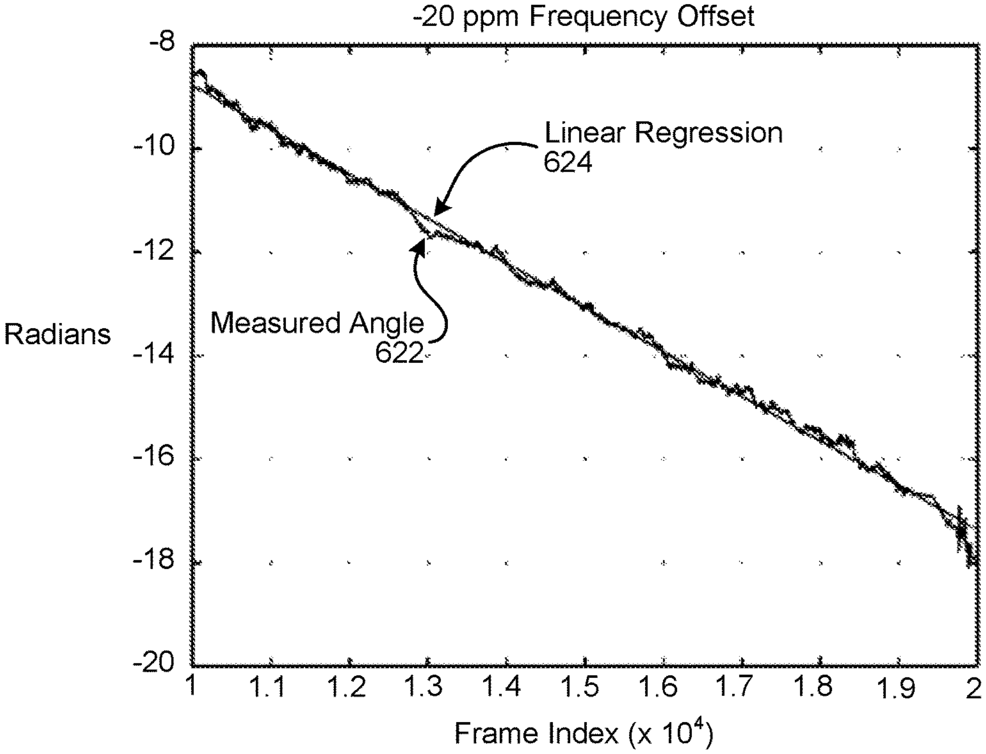
Figure 7:
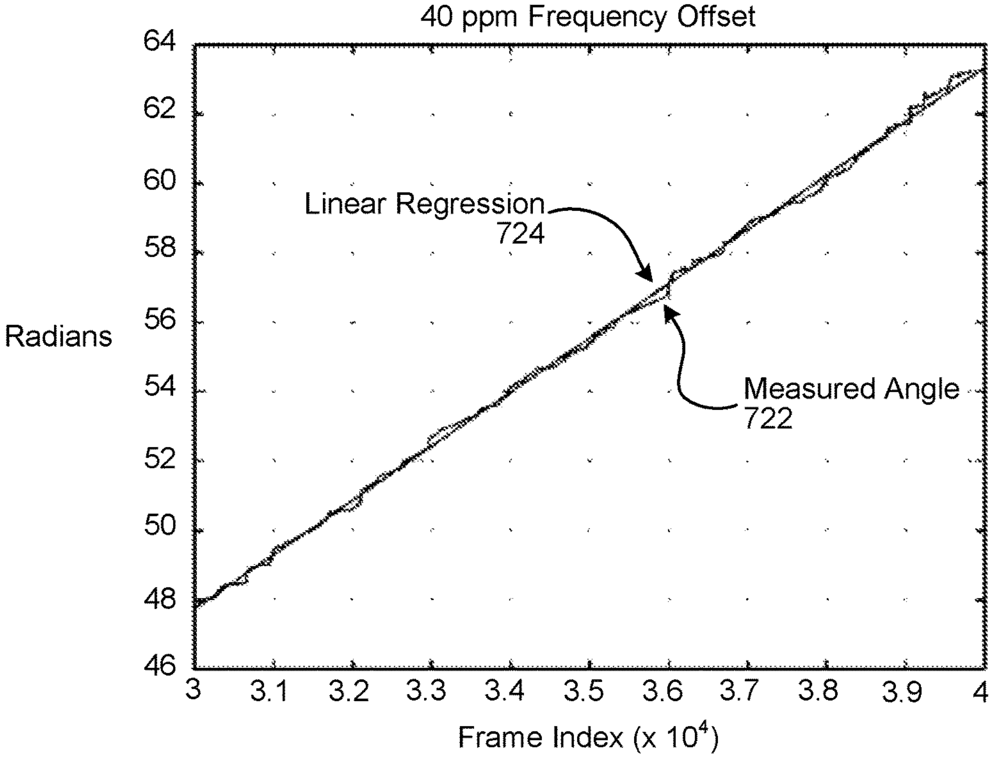
Figure 8:
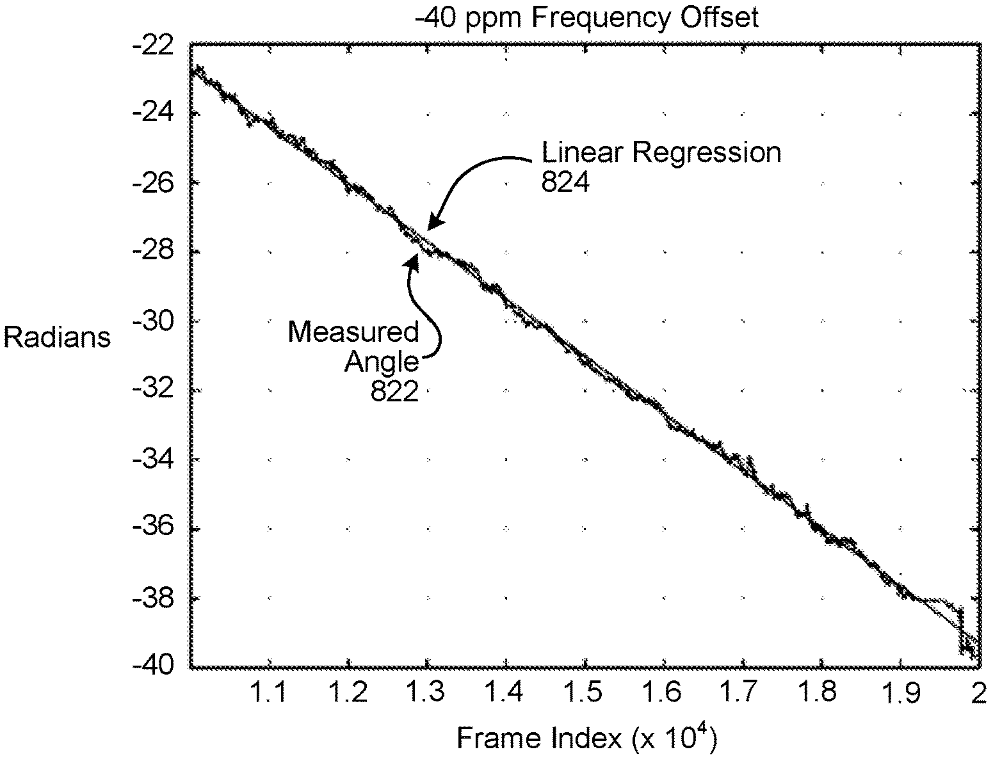

FIG. 5 is a graph illustrating a comparison of the angles (i.e., angle 324 in FIG. 3) measured 522 from coefficients known to include a 20 PPM frequency offset, in comparison to the angles "u" 524 determined by linear regression as described above in connection with Equations 12 to 14. FIG. 6 illustrates a comparison of the measured angles 622 for coefficients known to include a −20 PPM frequency offset, in comparison to the angles 624 determined by linear regression. FIG. 7 illustrates a comparison of the measured angles 722 for coefficients known to include a 40 PPM frequency offset, in comparison to the angles 724 determined by linear regression. FIG. 8 illustrates a comparison of the measured angles 822 for coefficients known to include a −40 PPM frequency offset, in comparison to the angles 824 determined by linear regression. As illustrated in FIGS. 5 to 8, the process in FIG. 4 provides a fairly accurate measure of coefficient rotation.

As an additional feature, AEC systems generally do not handle large signal propagation delays "D" well between the reference signals x(n) 112 and the echo signals y(n) 120. While the PPM for a system may change over time (e.g., due to thermal changes, etc.), the propagation delay time D remains relatively constant. The STFT AEC "taps" as described above may be used to accurately measure the propagation delay time D for each channel, which may then be used to set the delay provided by each of the buffers 162.

For example, assume that the microphone echo signal y 120 and reference signal x 112 are not properly aligned. Then, there would be a constant delay D (in samples) between the transmitted reference signals x 112 and the received echo signals y 120. This delay in the time domain creates a rotation in frequency domain.

If x(t) is the time domain signal and X(f) is the corresponding Fourier transform of x(t), then the Fourier transform of x(t−D) would be X(f)*exp(−j*f*D).

If echo cancellation algorithm is designed with long tail length (the number of taps of AEC frequency impulse response (FIR) filter is long enough), then the AEC will converge with initial D taps close to zero. Simply, AEC will lose first D taps. If D is large (e.g., D could be 100 ms or larger), then impact on AEC performance will be large. Hence, the delay D should be measured and should be compensated.

Figure 9:
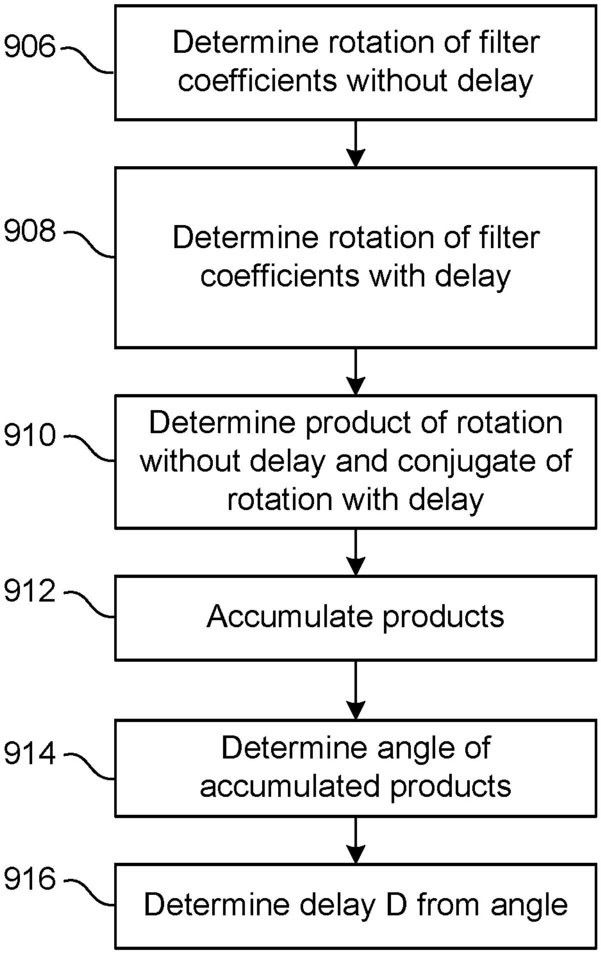
FIG. 9 illustrates a process that may be used to determine the delay between a reference signal and an echo signal.

FIG. 9 illustrates a process for determining D. With perfect alignment (D=0), referring to Equations 6.4 and 7, the error is calculated as:

$$\text{Error}(k) = Y(k) - \sum_{m=0}^{M-1} X(k, r-m) * W(k, m) \qquad [16]$$

Where Y, X and W are STFT outputs of microphone, reference signal, and the AEC taps. Also, in Equation 16, the coefficient W(k,m) corresponds to AEC taps with zero D=0 (no delay).

With D samples delay, the error is calculated as:

$$\text{Error}(k) = Y(k) - \sum_{m=0}^{M-1} X(k, r-m) * W(k, m) * \exp\left(-j*2*pi*k*\frac{D}{N}\right) \qquad [17]$$

Where, N is the number of "points" of the FFT used for the STFT and k is a bin index.

Comparing Equations 16 and 17, the rotation of the AEC coefficients W(k,m) may be determined (906) by dividing the error in Equation 17 by the Error in Equation 16. This rotation may be determined (906) directly from:

$$\exp\left(-j*2*pi*k*\frac{D}{N}\right) \qquad [18]$$

For each bin index k, there are M taps: W(k,m), m=0, 1, . . . , M−1. For each bin index k, calculations may use the first index m=0. For simplicity, denote $W_{no\_delay}$(n)=W(k,0). Hence, if the delay is D, the coefficient W(k,0) with delay may be determined (908) as:

$$W_{with\_delay\_D}(k) = W_{no\_delay}(k)^* \exp\left(-j*2*pi*k*\frac{D}{N}\right) \qquad [19]$$

The product of the coefficient with delay and the conjugate of the same coefficient is then determined (910):

$$P(k)W_{with\_delay\_D}(k+1)^*\text{conj}(W_{with\_delay\_D}(k)) \qquad [20]$$

The result corresponds to:

$$P(k)=H_k^*\exp(-j^*2^*\text{pi}^*D/N) \qquad [21]$$

where, $$H_k=[W_{no\_delay}(k+1)^*\text{conj}(W_{no\_delay}(n))] \qquad [22]$$

The values of W for bins k and k+1 will be close. Hence, then phase of $H_k$ will be negligible compared to D, if D is big. Since, there is noise in a system, then an accumulation (912) is performed of multiple P(n), k=k1, k2, k3, . . . , kn. The value of km is chosen based on power of W(n). This may be expressed as:

$$S=P(k1)+P(k2)+ \ldots +P(kq) \quad [23]$$

or $$S=A*\exp(-j*2*pi*D/N)+\text{mean(Noise)} \quad [24]$$

where, $A=(H_{k1}+H_{k2}+ \ldots +H_{kq})/q$.

An angle is then determined (914) for the accumulated products:

$$\text{angle}(S)\cong\text{angle}(\exp(-j*2*pi*D/N)) \quad [25]$$

or $$\text{angle}(S)\cong-2*pi*D/N \quad [26]$$

Hence, the delay D may be determined (916) as:

$$D=-N*\text{angle}(S)/(2*pi) \quad [27]$$

The sign of D indicates direction of alignment. Based on the delay, the read and write pointers of the circular buffers 162 are adjusted to provide the correct delay.

Frequency Offset Estimation (156 in FIG. 1C) may also be performed using a least mean squares (LMS) adaptive filter solution. Assume the frequency offset between the A/D converter 119 of microphone 118 and the D/A converter 115 of loudspeaker 114 is a ppm. Further assume that for frequency index/bin "k," the echo channel and estimated echo channel is H(k,r) and W(k,r) respectively. If y(n) 120 is the time-domain microphone output and corresponding STFT output is Y(k,f), then (ignoring noise):

$$Y(k,r)=H(k,r)*X(k,r)*e^{j*2*pi*k*\alpha*r} \quad [28]$$

The FDAEC 152 output (see FIGS. 1B and 1C) Z(k,r) is:

$$Z(k, r) = \sum_{m=0}^{M-1} W(k, m) * X(k, r-m) \quad [29]$$

where W(k,r) is the estimated echo channel and X(k,r) is a reference signal in the frequency domain. A cost function for each frequency bin k is defined as:

$$J(k,\alpha)=|E(k,r)|^2 \quad [30]$$

where:

$$E(k,r)=Y(k,r)-Z(k,r) \quad [7]$$

since:

$$|E(k,r)|^2=E(k,r)*\text{conj}(E(k,r)) \quad [31]$$

(if a complex number is p=u+jv, then conj(p)=u−jv).

The cost function of the LMS (least mean square) algorithm to be minimized is the partial derivative of J(k, α) relative to α, which should be calculated and is to be set to zero.

$$\frac{\partial}{\partial\alpha}J(k,\alpha) = conj(E(k,r)) * \frac{\partial}{\partial\alpha}E(k,r) + E(k,r) * \frac{\partial}{\partial\alpha}conj(E(k,r)) \quad [32]$$

Using Equation [28], this results in:

$$\frac{\partial}{\partial\alpha}E(k,r) = j*2*pi*k*r*Y(k,r) \quad [33]$$

$$\frac{\partial}{\partial\alpha}conj(E(k,r)) = -j*2*pi*k*r*conj(Y(k,r)) \quad [34]$$

Then, using Equations 32 to 34 produces:

$$\frac{\partial}{\partial\alpha}J(k,\alpha) = j*2*pi*k*r*[Y(k,r)*conj(E(k,r) - conj(Y(k,r))^{*}E(k,r)] \quad [35]$$

resulting in:

$$Y(k,r)*\text{conj}(E(k,r)-\text{conj}(Y(k,r))*E(k,r)=2*j*\text{Imag}(Y(k,r)*\text{conj}(E(k,r)) \quad [36]$$

Hence, $$\frac{\partial}{\partial\alpha}J(k,\alpha) = -4*pi*k*r*Imag(Y(k,r)*conj(E(k,r)) \quad [37]$$

Then, the update equation of the LMS algorithm of frequency-offset estimation for tone index k would be:

$$\alpha_{new} = \alpha_{old} - \mu*\frac{\partial}{\partial\alpha}J(k,\alpha) \quad [38]$$

The proportional part 2*pi*k should be taken out from Equation [38], to make frequency offset independent of frequency index k. Then, for all frequency tones the $$\alpha_{new}=\alpha_{old}+2*\mu*r*\text{Imag}(Y(k,r)*\text{conj}(E(k,r)) \quad [39]$$

where r is a number of frames between updates, the function "Imag" gives the imaginary part of a complex number, and the function "conj" gives the complex conjugate. If Equation [39] is applied for each frame to update the frequency offset, then r=1 and the initial value of α=0, after every update, the frequency offset value a ppm is computed as:

$$\alpha=\alpha+\alpha_{new} \quad [40]$$

Figure 10:
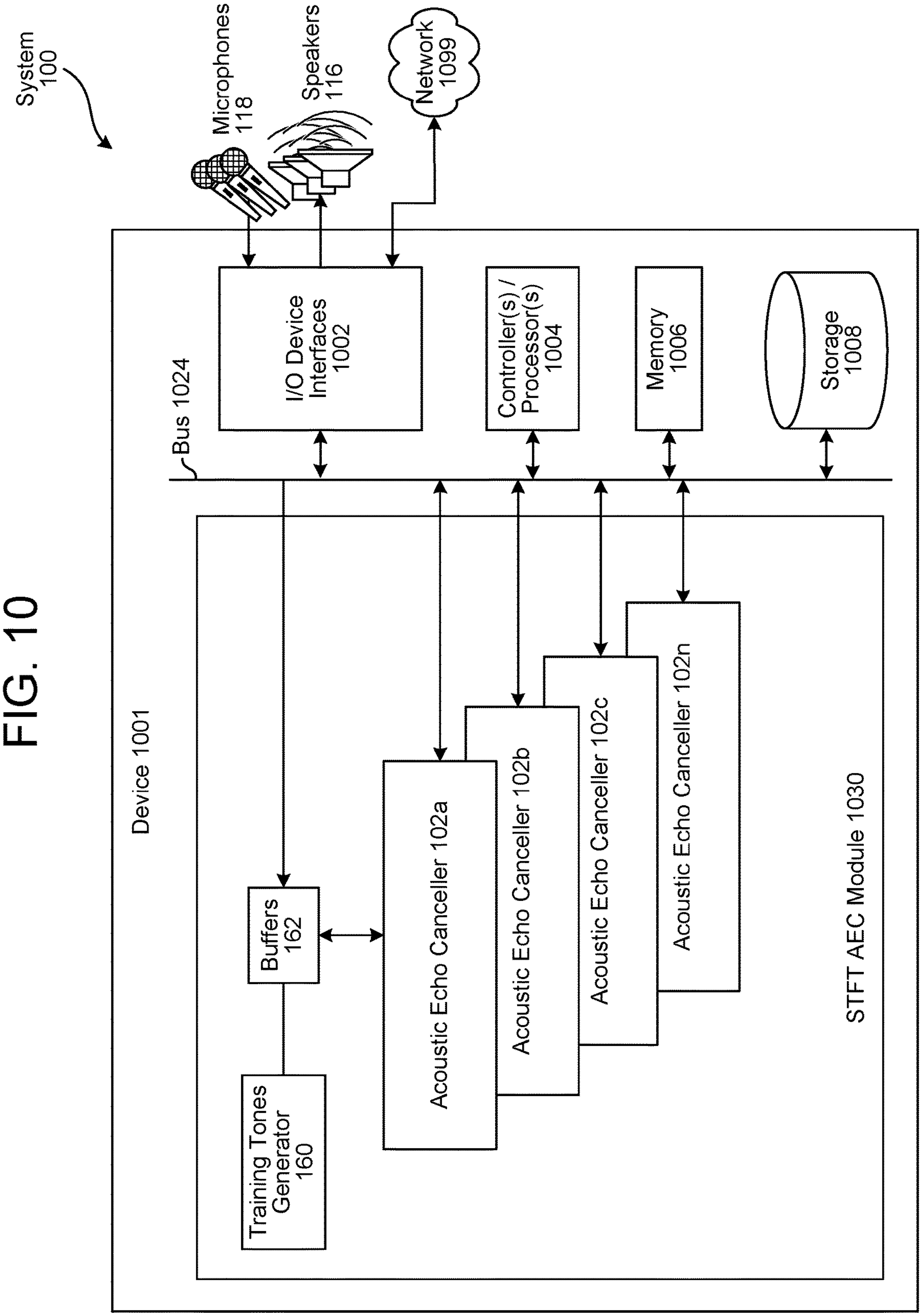
FIG. 10 is a block diagram conceptually illustrating example components of a system for echo cancellation.

FIG. 10 is a block diagram conceptually illustrating example components of the system 100. In operation, the system 100 may include computer-readable and computer-executable instructions that reside on the device 1001, as will be discussed further below.

The system 100 may include one or more audio capture device(s), such as a microphone or an array of microphones 118. The audio capture device(s) may be integrated into the device 1001 or may be separate.

The system 100 may also include an audio output device for producing sound, such as speaker(s) 116. The audio output device may be integrated into the device 1001 or may be separate.

The device 1001 may include an address/data bus 1024 for conveying data among components of the device 1001. Each component within the device 1001 may also be directly connected to other components in addition to (or instead of) being connected to other components across the bus 1024.

The device 1001 may include one or more controllers/processors 1004, that may each include a central processing unit (CPU) for processing data and computer-readable instructions, and a memory 1006 for storing data and instructions. The memory 1006 may include volatile random access memory (RAM), non-volatile read only memory (ROM), non-volatile magnetoresistive (MRAM) and/or other types of memory. The device 100 may also include a data storage component 1008, for storing data and controller/processor-executable instructions (e.g., instructions to perform the algorithms illustrated in FIGS. 1, 4, and 9). The data storage component 1008 may include one or more non-volatile storage types such as magnetic storage, optical storage, solid-state storage, etc. The device 1001 may also be connected to removable or external non-volatile memory and/or storage (such as a removable memory card, memory key drive, networked storage, etc.) through the input/output device interfaces 1002.

Computer instructions for operating the device 1001 and its various components may be executed by the controller(s)/processor(s) 1004, using the memory 1006 as temporary "working" storage at runtime. The computer instructions may be stored in a non-transitory manner in non-volatile memory 1006, storage 1008, or an external device. Alternatively, some or all of the executable instructions may be embedded in hardware or firmware in addition to or instead of software.

The device 1001 includes input/output device interfaces 1002. A variety of components may be connected through the input/output device interfaces 1002, such as the speaker(s) 116, the microphones 118, and a media source such as a digital media player (not illustrated). The input/output interfaces 1002 may include A/D converters 119 for converting the output of microphone 118 into signals y 120, if the microphones 118 are integrated with or hardwired directly to device 1001. If the microphones 118 are independent, the A/D converters 119 will be included with the microphones, and may be clocked independent of the clocking of the device 1001. Likewise, the input/output interfaces 1002 may include D/A converters 115 for converting the reference signals x 112 into an analog current to drive the speakers 114, if the speakers 114 are integrated with or hardwired to the device 1001. However, if the speakers are independent, the D/A converters 115 will be included with the speakers, and may be clocked independent of the clocking of the device 1001 (e.g., conventional Bluetooth speakers).

The input/output device interfaces 1002 may also include an interface for an external peripheral device connection such as universal serial bus (USB), FireWire, Thunderbolt or other connection protocol. The input/output device interfaces 1002 may also include a connection to one or more networks 1099 via an Ethernet port, a wireless local area network (WLAN) (such as WiFi) radio, Bluetooth, and/or wireless network radio, such as a radio capable of communication with a wireless communication network such as a Long Term Evolution (LTE) network, WiMAX network, 3G network, etc. Through the network 1099, the system 100 may be distributed across a networked environment.

The device 1001 further includes an STFT module 1030 that include the training tone generator(s) 160, the circular data buffers 162, and the individual AEC 102, where there is an AEC 102 for each microphone 118.

Multiple devices 1001 may be employed in a single system 100. In such a multi-device system, each of the devices 1001 may include different components for performing different aspects of the STFT AEC process. The multiple devices may include overlapping components. The components of device 1001 as illustrated in FIG. 10 is exemplary, and may be a stand-alone device or may be included, in whole or in part, as a component of a larger device or system. For example, in certain system configurations, one device may transmit and receive the audio data, another device may perform AEC, and yet another device my use the error signals 126 for operations such as speech recognition.

The concepts disclosed herein may be applied within a number of different devices and computer systems, including, for example, general-purpose computing systems, multimedia set-top boxes, televisions, stereos, radios, server-client computing systems, telephone computing systems, laptop computers, cellular phones, personal digital assistants (PDAs), tablet computers, wearable computing devices (watches, glasses, etc.), other mobile devices, etc.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of digital signal processing and echo cancellation should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk and/or other media. Some or all of the STFT AEC module 1030 may be implemented by a digital signal processor (DSP).

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method, comprising:
processing, at an adaptive filter, a first frame of a frequency-domain reference signal;
calculating a first coefficient for the adaptive filter;
determining a first phase rotation of a first phase vector corresponding to the first coefficient;
processing, at the adaptive filter, a second frame of a frequency-domain reference signal;
calculating a second coefficient for the adaptive filter;
determining a second phase rotation of a second phase vector corresponding to the second coefficient;
processing, at an adaptive filter, a third frame of a frequency-domain reference signal;
calculating a third coefficient for the adaptive filter;
determining a third phase rotation of a third phase vector corresponding to the third coefficient;
calculating a first phase angle between the first phase rotation and the second phase rotation calculating a second phase angle between the second phase rotation and the third phase rotation;

determining a linear fit for the first phase angle and the second phase angle; and determining a value of a frequency offset based on a slope of the linear fit.

2. The computer-implemented method of claim 1, further comprising:

transmitting, to a wireless speaker, a time-domain reference signal representing a sinusoidal tone;

applying a Fourier transform to the time-domain reference signal to determine the frequency-domain reference signal;

filtering the frequency-domain reference signal using the adaptive filter; and subtracting an output of the adaptive filter from the frequency-domain signal to determine a first frequency-domain output signal.

3. The computer-implemented method of claim 2, further comprising:

transmitting an audio output signal to a wireless speaker;

receiving, from a microphone, an audio input signal including a representation of audio corresponding to the audio output signal; and performing acoustic echo cancellation on the audio input signal based on the frequency offset.

4. The computer-implemented method of claim 3, wherein performing the acoustic echo cancellation comprises adding or deleting at least one sample of the audio output signal.

5. The computer-implemented method of claim 1, further comprising:

calculating a propagation delay time based on a difference between the first phase angle and the second phase angle; and delaying a time-domain reference signal based on the propagation delay time.

6. The computer-implemented method of claim 1, further comprising:

skipping one or more samples of a time-domain reference signal in response to the frequency offset being negative, and adding a duplicate copy of one or more samples of the time-domain reference signal in response to the frequency offset being positive.

7. The computer-implemented method of claim 1, further comprising:

calculating a linear regression based on a difference between the first phase angle and the second phase angle.

8. The computer-implemented method of claim 1, further comprising:

adding a multiple of $\pm 2\pi$ to the second phase angle when a difference between the first phase angle and the second phase angle is greater than a jump tolerance.

9. The computer-implemented method of claim 1, wherein calculating the first, second, and third coefficients for the adaptive filter comprises updating a matrix of complex numbers representing tones and frames.

10. The computer-implemented method of claim 1, further comprising:

estimating the frequency offset by using a least-mean-squares adaptive filter.

11. A computing device comprising:

at least one processor;

memory including instructions operable to be executed by the at least one processor to perform a set of actions to configure the computing device to:

processing, at an adaptive filter, a first frame of a frequency-domain reference signal;

calculating a first coefficient for the adaptive filter;

determine a first phase rotation of a first phase vector corresponding to the first coefficient;

processing, at an adaptive filter, a second frame of a frequency-domain reference signal;

calculating a second coefficient for the adaptive filter;

determine a second phase rotation of a second phase vector corresponding to the second coefficient;

processing, at an adaptive filter, a third frame of a frequency-domain reference signal;

calculating a third coefficient for the adaptive filter;

determine a third phase rotation of a third phase vector corresponding to the third coefficient;

calculate a first phase angle between the first phase rotation and the second phase rotation;

calculate a second phase angle between the second phase rotation and the third phase rotation;

determine a linear fit for the first angle and the second angle; and determine a value of a frequency offset based on a slope of the linear fit.

12. The computing device of claim 11, wherein the instructions further configure the computing device to:

transmit, to a wireless speaker, a time-domain reference signal representing a sinusoidal tone;

apply a Fourier transform to the time-domain reference signal to determine the frequency-domain reference signal;

filter the frequency-domain reference signal using the adaptive filter; and subtract an output of the adaptive filter from the frequency-domain signal to determine a first frequency-domain output signal.

13. The computing device of claim 12, wherein the instructions further configure the computing device to:

transmit an audio output signal to a wireless speaker;

receive, from a microphone, an audio input signal including a representation of audio corresponding to the audio output signal; and perform acoustic echo cancellation on the audio input signal based on the frequency offset.

14. The computing device of claim 13, wherein the instructions that configure the computing device to perform the acoustic echo cancellation comprise instructions that configure the computing device to add or delete at least one sample of the audio output signal.

15. The computing device of claim 11, wherein the instructions further configure the computing device to:

calculate a propagation delay time based on a difference between the first phase angle and the second phase angle; and delay a time-domain reference signal based on the propagation delay time.

16. The computing device of claim 11, wherein the instructions further configure the computing device to:

skip one or more samples of a time-domain reference signal in response to the frequency offset being negative, and add a duplicate copy of one or more samples of the time-domain reference signal in response to the frequency offset being positive.

17. The computing device of claim 11, wherein the instructions further configure the process computing device or to:

calculate a linear regression based on a difference between the first phase angle and the second phase angle.

18. The computing device of claim 11, wherein the instructions further configure the computing device to:

add a multiple of ±2π to the second phase angle when a difference between the first phase angle and the second phase angle is greater than a jump tolerance.

19. The computing device of claim 11, wherein the instructions that configure the computing device to calculate the first, second, and third coefficient for the adaptive filter comprise instructions that configure the processor to update a matrix of complex numbers representing tones and frames.

20. The computing device of claim 11, wherein the instructions further configure the computing device to:

estimate the frequency offset by using a least-mean-squares adaptive filter.

* * * * *